United States Patent [19]

de Sivry et al.

[11] Patent Number: 4,485,344

[45] Date of Patent: Nov. 27, 1984

[54] APPARATUS FOR ELECTROMAGNETICALLY MEASURING THE OVALIZATION OF A FERROMAGNETIC PIPE

[75] Inventors: Bruno J. M. de Sivry; Jean-Louis Migliarese-Caputi, both of Paris; Guy J. Hervé, Nantes; Michel P. Baylot, Marseilles; Claude J. Colas, Nantes; Pierre Baudet, Etrechy, all of France

[73] Assignee: Compagnie Francaise des Petroles, Paris, France

[21] Appl. No.: 311,740

[22] Filed: Oct. 15, 1981

[30] Foreign Application Priority Data

Oct. 29, 1980 [FR] France ................. 80 23088

[51] Int. Cl.³ .............. G01B 7/14; G01N 27/72; G01R 33/12
[52] U.S. Cl. ................. 324/207; 324/232; 324/234; 324/262
[58] Field of Search ........... 324/202, 207, 208, 226, 324/228, 229–234, 242, 236, 243, 262

[56] References Cited

U.S. PATENT DOCUMENTS

| | | | |
|---|---|---|---|
| 2,764,734 | 9/1956 | Yates | 324/229 |
| 3,419,797 | 12/1968 | Libby | 324/229 X |
| 3,609,529 | 9/1971 | Skubiak et al. | 324/202 |
| 3,619,770 | 11/1971 | Forster | 324/233 |
| 3,699,429 | 10/1972 | Ratz | 324/332 |
| 3,740,998 | 6/1973 | Akulov | 324/202 |
| 3,900,793 | 8/1975 | Mansson | 324/233 |
| 3,948,082 | 4/1976 | Zumbach et al. | 324/230 X |
| 4,086,527 | 4/1978 | Cadot | 324/233 |

FOREIGN PATENT DOCUMENTS 508730  3/1976  U.S.S.R. .................. 324/262

*Primary Examiner*—Gerard R. Strecker
*Attorney, Agent, or Firm*—Sughrue, Mion, Zinn, Macpeak & Seas

[57] ABSTRACT

The invention relates to the measurement of the ovalization of a ferromagnetic pipe.

An electromagnetic pickup is moved in a circular path around the pipe, the pickup transmitting signals influenced by the radial distance between the pickup and the pipe. These signals are compared with signals from previous measurements made on a similar pipe to obtain indications of the radial distance between the pickup and the pipe so as to be able to deduce the transverse configuration of the pipe. The pickup is supplied with ac at a frequency of about 700 Hz and the signals from the pickup are compared with previously obtained signals both as to amplitude and phase.

The pickup is mounted on a circular slide movable along a circular track supported on a U-shaped collar which is fixed to the pipe.

9 Claims, 7 Drawing Figures

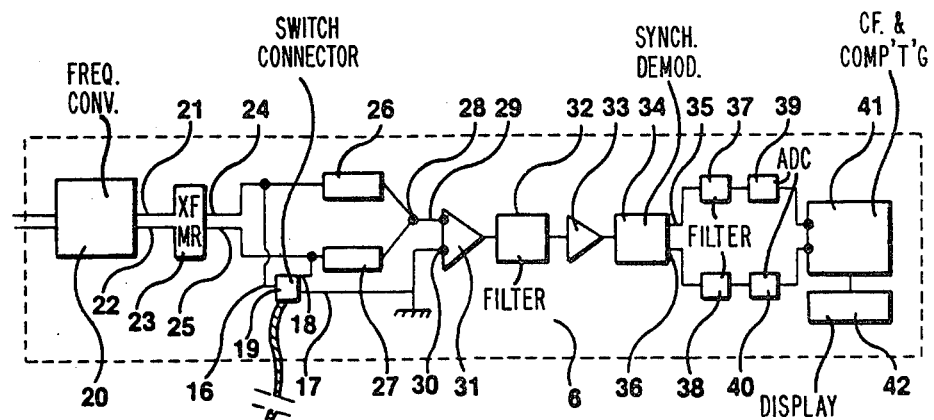
FIG. 1
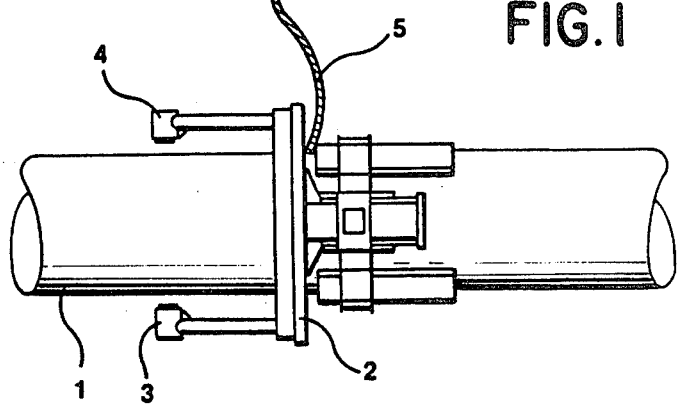
FIG. 2
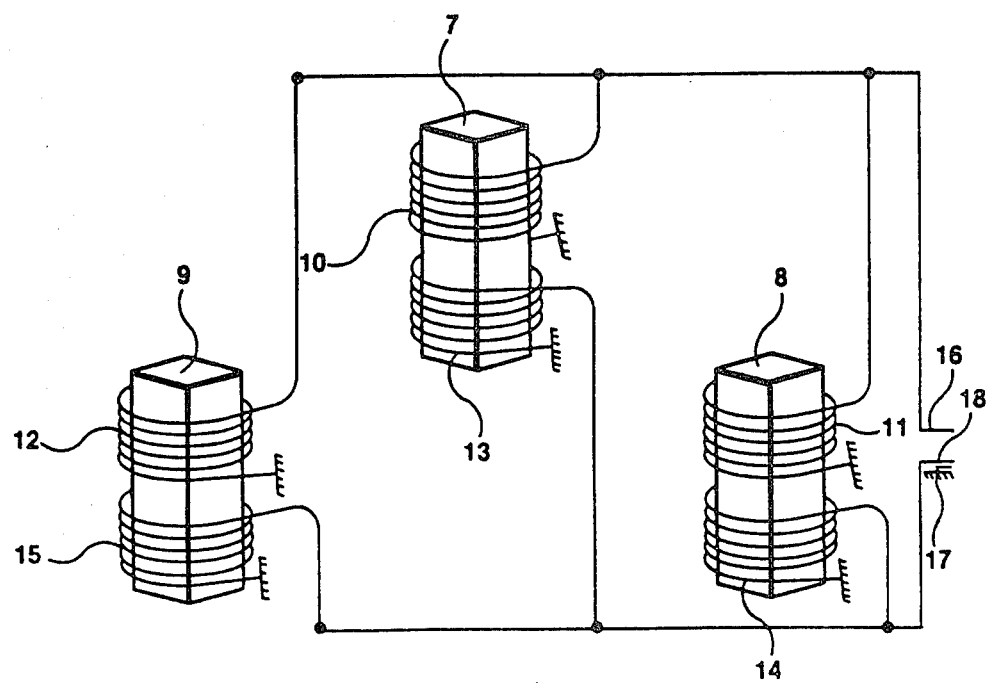

APPARATUS FOR ELECTROMAGNETICALLY MEASURING THE OVALIZATION OF A FERROMAGNETIC PIPE

The invention relates to the measurement of the ovalisation of a circular section pipe particularly of ferromagnetic material, particularly but not exclusively a concrete-clad steel pipe which may be coated with an anti-corrosion material and clad with concrete having thick reinforcements.

It has already been proposed to measure the ovalisation of a bare pipe, or a pipe stripped of concrete, by moving around the pipe a sensor held in contact with the pipe and connected by a displacement transducer to an electric-signal generator in such a manner that the signals transmitted by the generator are proportional to the radial displacements of the sensor.

This process cannot however be applied to a concrete-clad pipe.

According to one aspect of the invention there is provided a process for measuring the ovalisation of a pipe, comprising moving an electromagnetic measuring pickup of a measurement module along a path extending round said pipe, said path being a circular path determined by said measurement module, and said electromagnetic pickup transmitting a signal which is influenced by the radial distance between said pickup and said pipe, for a plurality of measurement locations of said pickup on said circular path making a comparison between the signal transmitted by said pick-up and a plurality of signal values supplied by previous measurements made on a similar pipe to obtain therefrom indications relating to the distance between said locations and said pipe, and deducing therefrom information relating to the transverse configuration of said pipe.

The previous measurements may be made with the same pickup or a similar pickup on a pipe similar to that which is to be measured, but with various distances between pickup and pipe and, if the pipe is covered with reinforced concrete cladding, with various distances between reinforcement and pipe.

The electromagnetic pickup is advantageously fed with alternating-current voltage, and the comparison is made both in respect of amplitude and phase.

It has in fact been found that the phase displacement of the signal transmitted by an electro-magnetic pickup of this kind, in relation to the supply voltage of the pickup, varies in dependence on whether the electromagnetic pickup is near a continuous surface or near an open structure, such as a concrete cladding reinforcement.

If an electromagnetic pickup is placed near a pipe of ferromagnetic material covered with a cladding of reinforced concrete having thick reinforcements, the amplitude of the signal transmitted by the pickup will by itself give indeterminate information regarding the distance between the pickup and the pipe, because this amplitude depends not only on the distance between the pickup and the pipe but also on the distance between the reinforcement and the pipe, and this latter distance varies from one point of the pipe to another. This indetermination is eliminated by taking the phase of the signal into account.

Instead of considering the amplitude and the phase themselves (polar coordinates), it has been found more practical to make the comparison of the actual signal with results of previous measurements in respect of the components of the signal in phase with the supply voltage and in respect of the components in quadrature with the supply voltage (Cartesian coordinates).

The previous measurements make it possible for pickup-pipe isodistance lines and reinforcement-pipe isodistance lines to be plotted on a graph, by taking the aforesaid components as coordinates. The determination of an actual pickup-pipe or reinforcement-pipe distance is deduced by interpolation. This interpolation can in particular be effected automatically by logic comparator means associated with memory means receiving compilations of information which correspond to the graphs previously established.

It has been found that the maximum phase difference between the response of the pickup due to a continuous ferromagnetic surface and the response due to a thick ferromagnetic reinforcement occurs at a supply voltage frequency of about 700 Hz. The supply voltage is therefore advantageously fixed in the neighbourhood of this frequency.

The measurement of ovalisation may be made continuously on the periphery of a pipe or at discrete measurement locations. In the latter case, if the pipe is covered with concrete cladding having a mesh reinforcement, it is advantageous to select measurement locations radially in the centre of the meshes.

According to another aspect of the invention there is provided apparatus for carrying out the above method comprising a collar, means for fastening said collar on a pipe, a measurement module mounted on said collar, a circular track supported by said collar, a circular slide member disposed on said track, means for moving said slide member on said track, at least one longitudinal arm solid with said slide member, an electromagnetic pickup aligned radially towards the axis of said pipe and fixed on said arm, and an electric energy supply and signal processing means comprising comparison means associated with memory means, and means for electrical connection between said supply and processing means and said measurement module so as to permit the transmission to said supply and processing device of signals transmitted by said electromagnetic pickup.

The supply and processing device preferably comprises an alternating-current voltage supply and a synchronous demodulator for receiving signals transmitted by the electromagnetic pickup and which is designed to supply, from one input signal, two output signals related to the amplitude and the phase of the input signal.

An embodiment of the invention will now be described, by way of example only, with reference to the accompanying drawings.

In the drawings

FIG. 1 is a general diagram of an embodiment of an ovalisation measurement installation;

FIG. 2 is a diagram of an electromagnetic pickup for use in the installation of FIG. 1;

Figure 4:
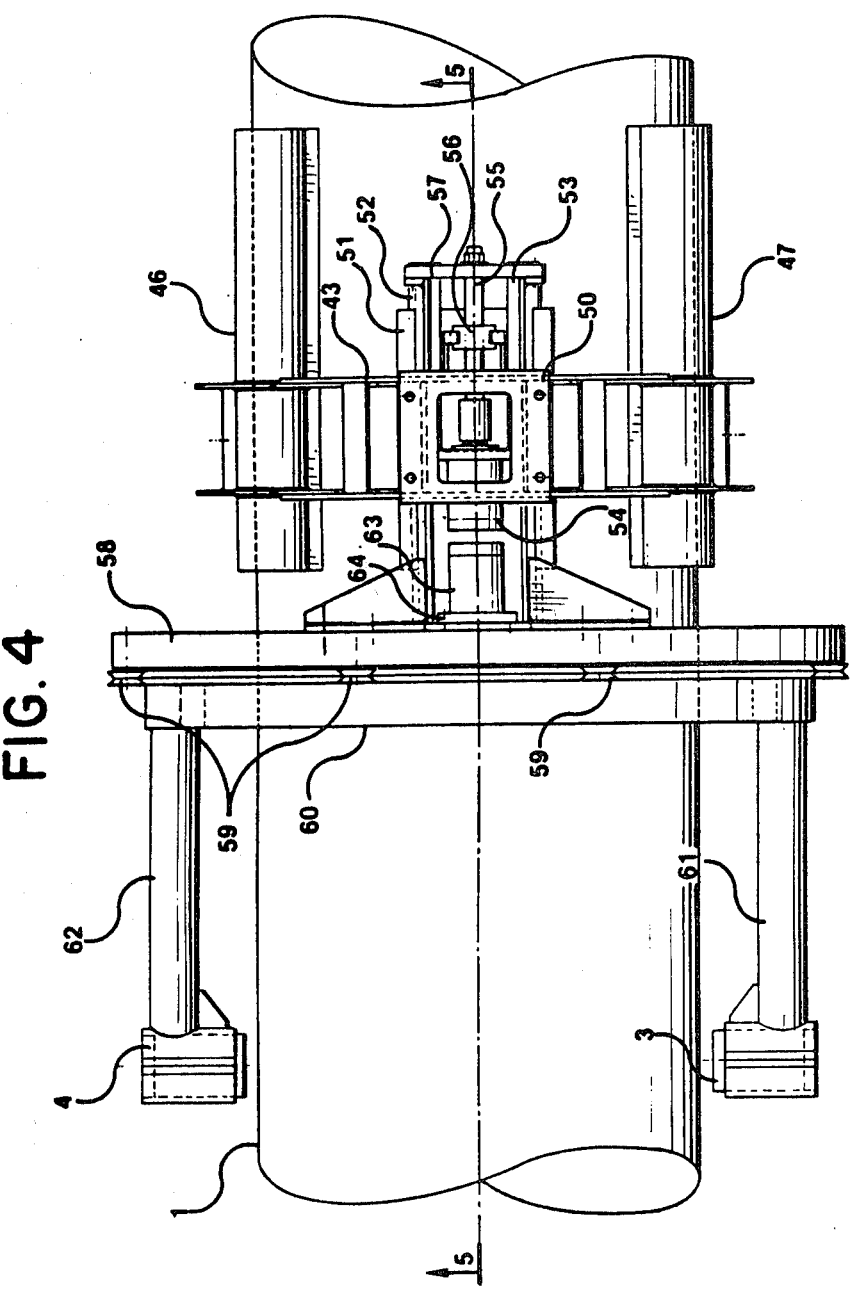
Figure 5:
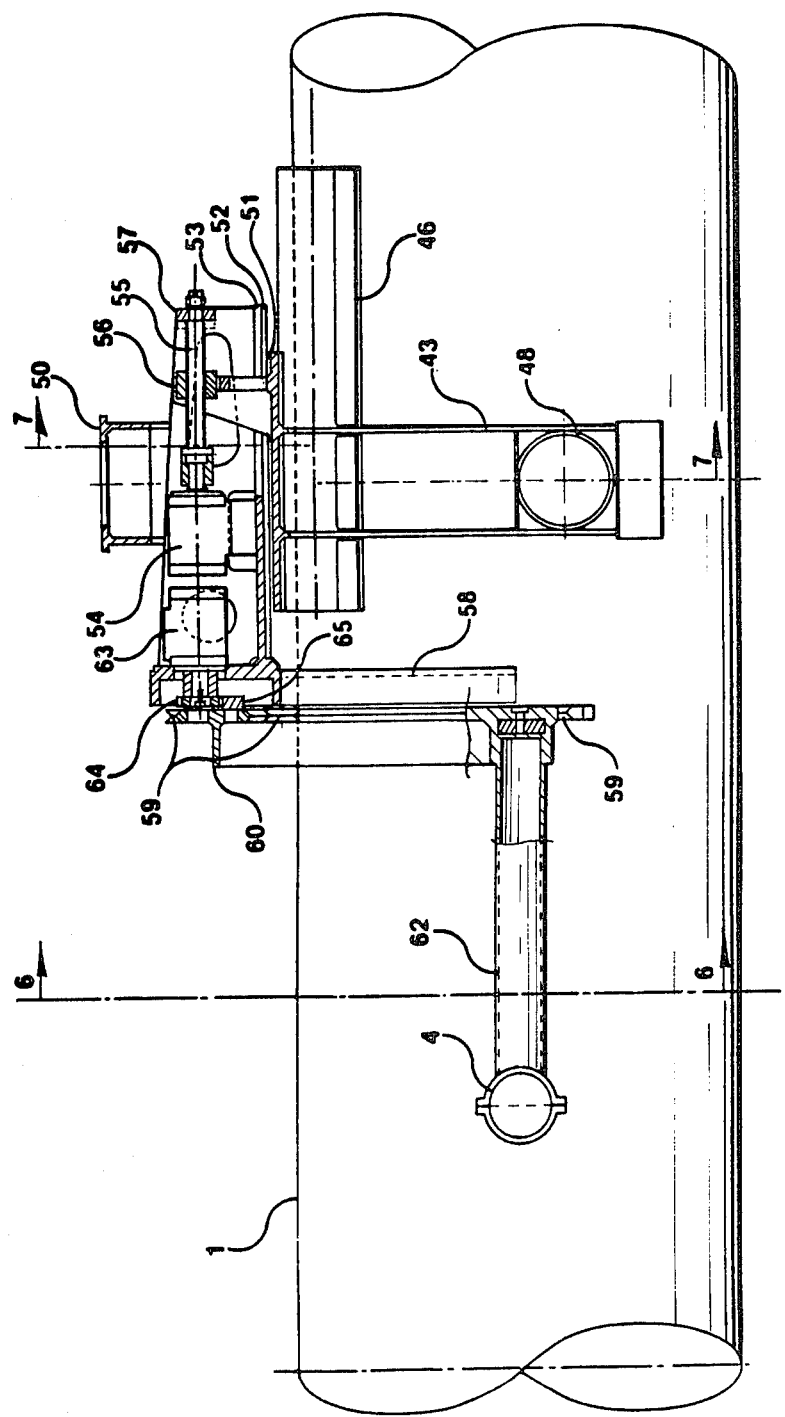
Figure 6:
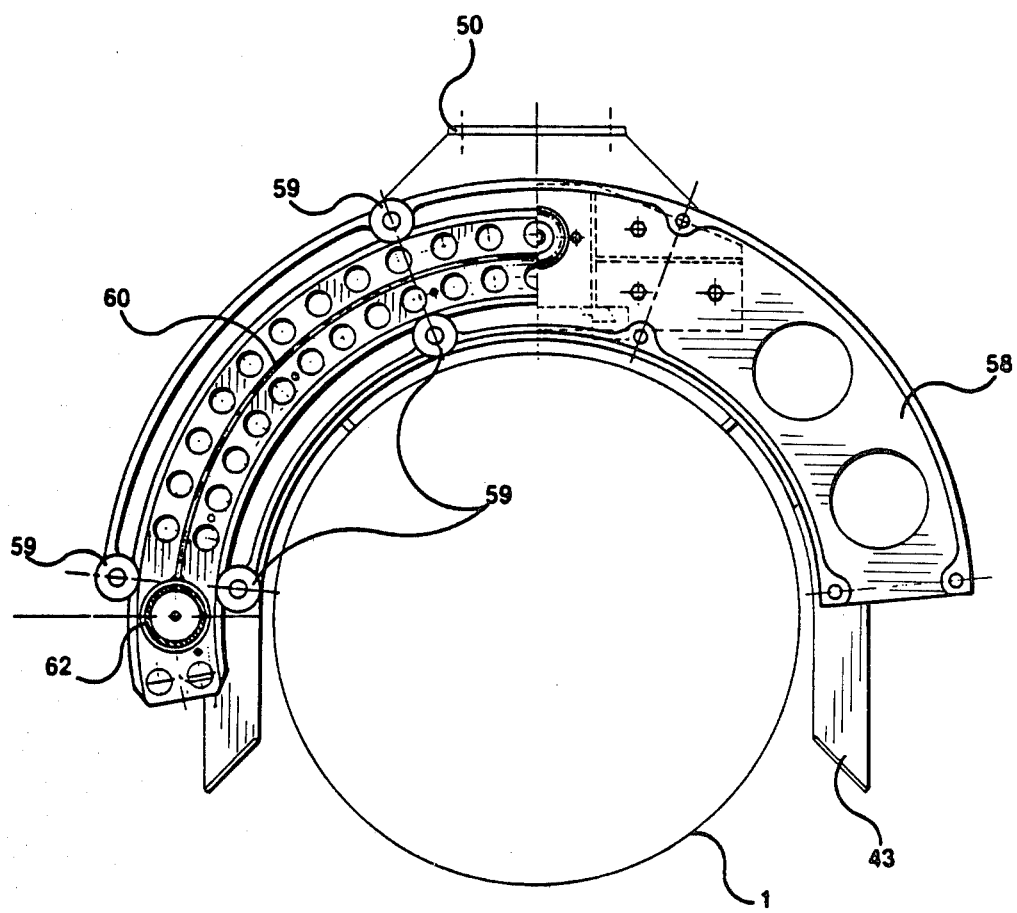
Figure 7:
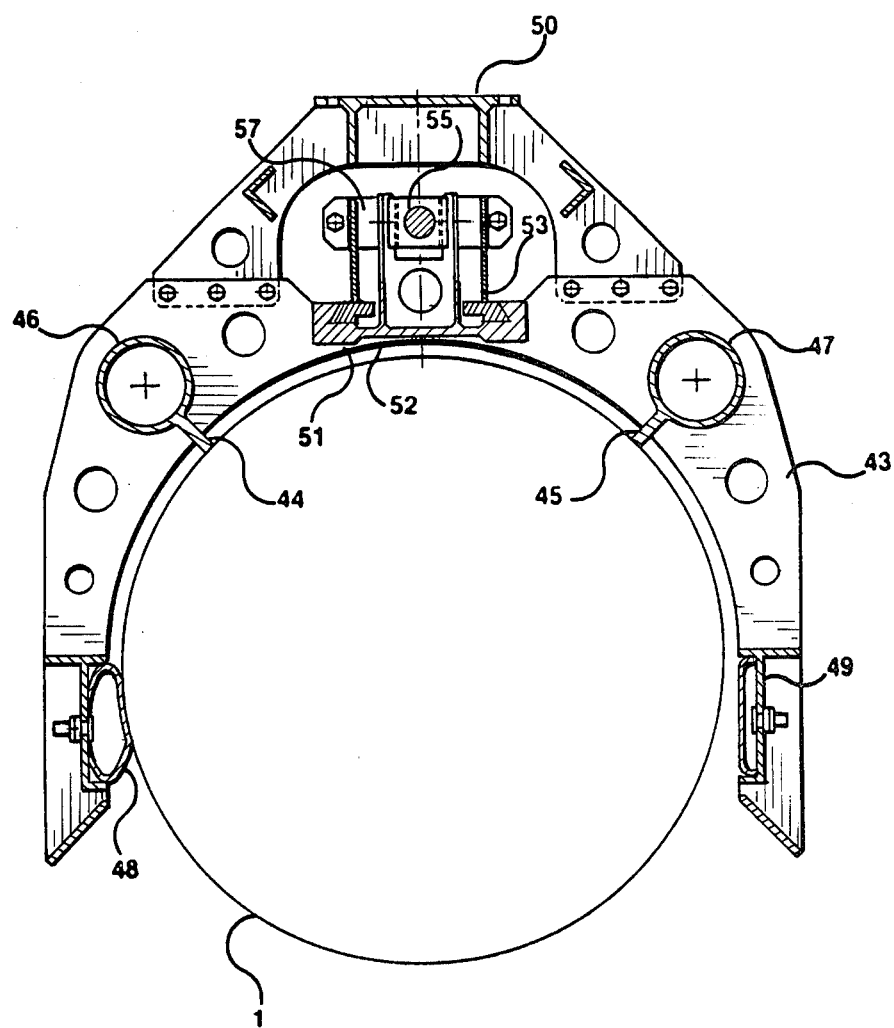

FIGS. 4 to 7 show various views of an embodiment of a measurement module placed on a pipe, FIG. 4 being a view from above, FIG. 5 being a view in section on the line 5—5 in FIG. 4, FIG. 6 being a view in section on the line 6—6 in FIG. 5, and FIG. 7 being a view in section on the line 7—7 in FIG. 5.

FIG. 1 shows an embodiment of a complete ovalisation measurement installation. A pipe 1, which is for example submerged in the sea, is provided with a measurement module 2 carrying electromagnetic pickups 3, 4. This module is connected, particularly as regards the pickups 3 and 4, by a cable 5 to a device 6 for the supply of electric energy and the processing of the signals transmitted, device 6 being disposed on the surface or in a submarine vehicle, where the pipe 1 is submerged.

Each of the pickups 3 and 4 comprises, for example, one or more magnetic cores and two coils disposed on each magnetic core. FIG. 2 illustrates an embodiment of a pickup comprising three parallel elongate magnetic cores 7, 8, 9 formed by stacked laminations and each carrying a first coil 10, 11, 12 situated near a first end of each core, and a second coil 13, 14, 15 situated near a second end of each core, the first and second ends being defined by a single direction extending along the axis of the core from the first end to the second in such a manner that, for example, the first coils are closer to the pipe during use, and the second coils are more remote from it. The arrangement of the cores and coils is enclosed in a moulding (not shown) of synthetic insulating material, and may be protected by a metal cover (not shown). The first coils are electrically connected together in parallel by a wire 16 and an earth 17; the second coils are electrically connected together in parallel by a wire 18 and the earth 17.

The device 6 comprises a connector 19 for connection to the cable 5 and associated with a switch enabling the device 6 to be connected to one or other of the pickups 3 and 4. Alternating-current voltage is supplied by way of a frequency converter 20 which maintains the supply voltage Ve at the output terminals 21 and 22 of the converter at a frequency of about 700 Hz, and a transformer 23 whose output terminals 24 and 25 are connected to a measuring bridge. This bridge comprises branches having two fixed resistors 26 and 27 of equal value and two variable impedances Z1 and Z2, one of which is constituted by the first coils 10, 11, and 12 and the other by the second coils 13, 14, 15 of a pickup. When the pickups 3 and 4 are not near a mass of ferromagnetic material, such as the pipe 1, the impedances Z1 and Z2 are equal and the measuring bridge is an equilibrium. Consequently, no voltage appears across the diagonal 28-17. On the other hand, when the pickups 3 and 4 are placed near the pipe 1, as shown in FIG. 1, and when one of them is connected to the device 6 by the switch connector 19, the measuring bridge becomes unbalanced because the impedances Z1 and Z2 are no longer equal. The voltage signal VS obtained across the diagonal 28-17 is used to evaluate the distance between the pickup 3 or 4 and the pipe 1, as will be explained later on.

The advantage of supply through a transformer such as 23 is that the measuring circuit is galvanically isolated from the electric-energy supply circuit, and it is thus possible to form an earth in the circuit of the measuring diagonal, but it would also be possible for electric current to be injected into the measuring bridge from a constant-current generator.

The diagonals 28-17 are connected respectively to the inputs 29 and 30 of an amplifier 31, this connection being made direct as in FIG. 1 or by way of a transformer.

The voltage signal VS amplified in the amplifier 31 passes to a filter 32 having a very narrow bandpass, centred on the frequency of 700 Hz, and then to another amplifier 33, at the output of which a synchronous demodulator 34 effects a demodulation of the signal in order to obtain from it two components at outputs 35 and 36. Each of these components follows a path comprising a filter 37 and 38 respectively of the integrator type, and an analog-to-digital converter 39 and 40 respectively, before entering a comparison and computing means 41 including memory means and associated with a display means 42.

The demodulator 34 detects the peak voltage of the amplified and filtered voltage signal VS which it receives, in order to effect amplitude demodulation, and detects the phase displacement of the signal in relation to the voltage Ve in order to effect phase demodulation. It can also effect a sampling of the amplified and filtered voltage signal VS at a first moment when the voltage Ve passes through a determined value, particularly a zero value, and at a second moment offset by $\pi/2$ from the said first moment, so as to obtain components X and Y of the voltage vector VS, on orthogonal axes, particularly axes which are in phase and in quadrature with the voltage vector Ve.

Figure 3:
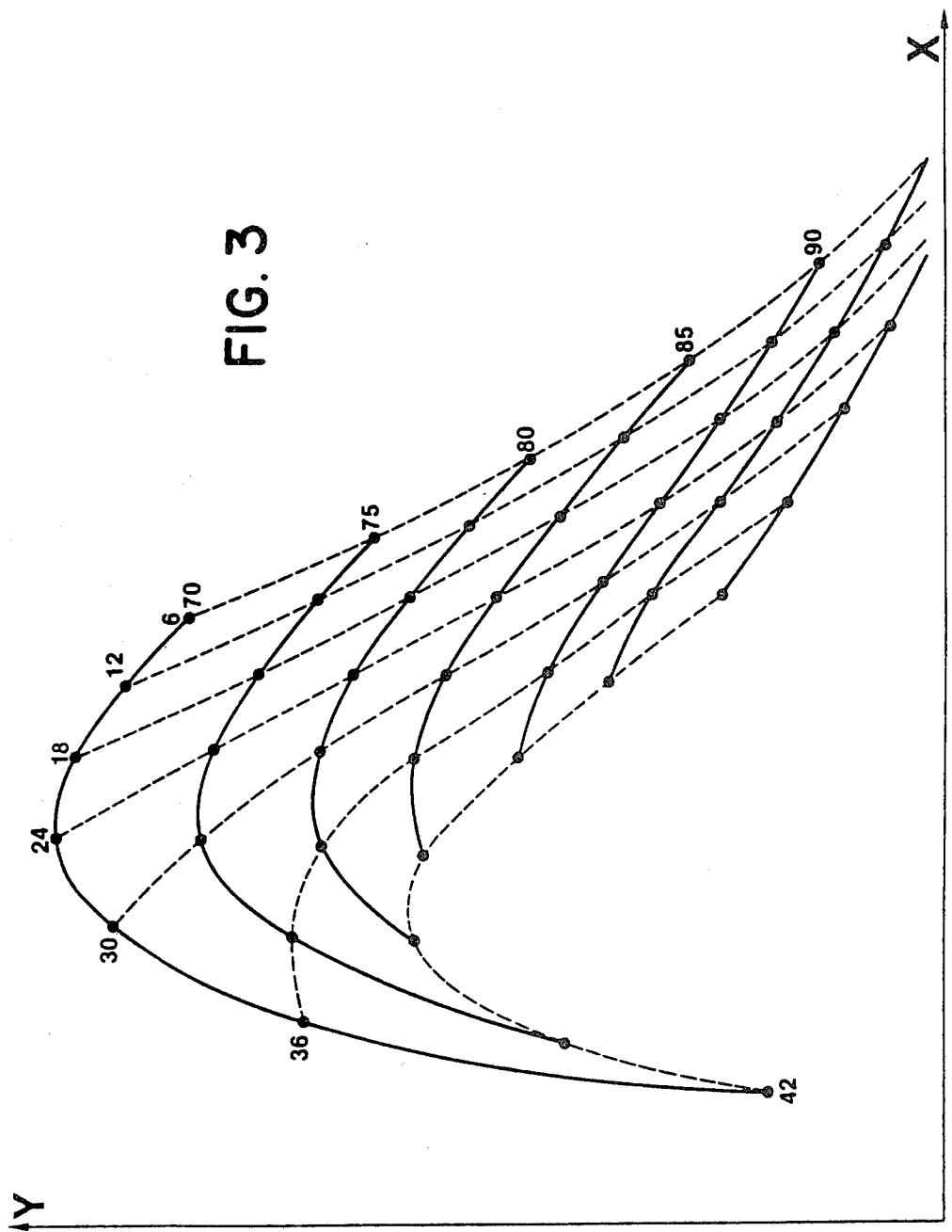
FIG. 3 shows a graph plotted from previous tests.

A compilation of the values of the components X and Y obtained in previous measurements made, as already mentioned, with pickups similar to the pickups 3 and 4, or with the actual pickups 3 and 4, on a pipe similar to the pipe 1 for various distances between pickup and pipe and for various distances between pipe and reinforcement, the reinforcement used having a mesh identical with that of the reinforcement which may surround the pipe 1, is entered into device 41. If the pipe 1 to be measured is not surrounded by reinforcement or is surrounded by a thin grid having no effect on the pickups, a compilation of values, previously obtained with a pipe having no reinforcement or having reinforcement of any kind (in the latter case the compilation is then superabundant for the requirements of the present measurement), is used. FIG. 3 shows an example of a graph corresponding to this compilation, the unbroken lines being pickup-pipe isodistance lines plotted for distances of 70, 75, 80, 85, 90, 95, and 100 mm, and the broken lines being reinforcement-pipe isodistance lines plotted for distances of 6, 12, 18, 24, 30, 36, and 42 mm.

The device 41 makes a comparison between the actual values of X and Y which it receives and the values stored in it, and by interpolation determines the actual distance between pickup and pipe. It may also subsidiarily give the distance between reinforcement and pipe.

From the position of the pickup the device 41 also establishes the position of the point in the pipe where the measurement was made, by reference to the pickup-pipe distance which it has determined, starting from the position of the initial position of the pickup. It then checks whether the various positions thus established do or do not lie on a circle. In addition, a display of the circle, or of the curve taking its place, may be provided on the screen of the display means 42.

Instead of automating all the operations, it is of course possible to leave it to the operator to carry out certain operations himself, knowledge of the voltage vector VS given by the components X and Y making it possible to determine, with the aid of graphs, the distance between pickup and pipe and then to establish the position of the point in the pipe where the measurement was made, thereupon verifying that this position lies on a circle.

The device 41 also makes it possible to determine the position of a pickup 3 or 4 in relation to the thick mesh of the reinforcement which may be provided in a concrete-clad pipe 1. By "thick mesh" is understood mesh formed by bars of a diameter of at least about 5 mm. When a pickup 3 or 4 is moved around and/or along the pipe 1, the signals transmitted by this pickup will show peaks corresponding to the bars forming the mesh. The device 41 then transmits instructions to the measurement module 2 for the pickup to be placed, during a measurement, at the centre of a mesh, that is to say between two successive positions shown as corresponding to a peak of the signals transmitted by the pickup during the operation of seeking a measurement position. This search may be made in two orthogonal directions, a longitudinal direction and a circumferential direction, the measurement module 2 being provided with means for moving the pickups both in the circumferential direction and in the longitudinal direction.

FIGS. 4, 5, 6, and 7 show a measurement module 2 placed on a pipe 1. The module 2 is mounted on the pipe 1 by means of a fixed half-collar 43 having the shape of an inverted U and applied to the pipe 1 by two ribs 44 and 45, which are, as shown, carried by floats 46 and 47 solid with the rounded portion of the U formed by the fixed half-collar 43. The collar is fixed on the pipe 1 by two flexible inflatable gripper jacks 48 and 49 carried by the two arms of the U of the half-collar 43. The jacks, when in the inflated state, grip the pipe 1 over the half-circumference complementary to that on which the ribs 44 and 45 are applied. The jack 48 is shown in the inflated state and the jack 49 in the deflated state in FIG. 7. At the top the half-collar 43 carries a plate 50 enabling it to be fastened to an intervention unit (not shown) which is used to put it in position and to control the measurement module 2. The intervention unit may consist of an autonomous submarine, an observation turret, or a remote-controlled unit. It is provided with the conventional equipment for such units and means of connection to the measurement module 2.

In the region of the apex of the U defined inwardly by the half-collar 43, the half-collar carries a fixed female slide member 51, for example of dovetail shape, on which a male slide member 52, carried by a carriage 53, slides longitudinally. The longitudinal movement of this carriage 53 is brought about by an arrangement comprising a motor 54, for example of a step-by-step electric or hydraulic motor type, optionally with speed reduction means, together with a worm 55 which is driven rotationally by the motor, the motor and the worm being carried by the carriage 53, and a nut 56 solid with the fixed half-collar 43. The worm 55 is supported by a cross-member 57 at its end opposite that connected to the motor 54.

In the left-hand part of FIGS. 4 and 5 the carriage 53 is shown carrying a half-crown 58 which together with rollers 59 (which have been shown in FIG. 6 only in the left-hand part) serve as a hack for a part-circular slide member 60 forming approximately a half-circumference and of which only the left-hand half is shown in FIG. 6. At its end the slide member 60 is solid with two longitudinal arms 61 and 62 of non-magnetic material, for example of polyvinyl chloride, carrying diametrically opposite pickups 3 and 4 respectively. The distance between the pickups 3 and 4 and the pipe 1 can be adjusted manually on the surface by radial displacement of the pickups on the arms carrying them.

The half-crown 58 carries a motor 63, which may in particular be of the step-by-step electric or hydraulic motor type, optionally with a speed reducer. The motor 63 drives a pinion 64 meshing with a rack 65 solid with the circular slide member 60. The circular slide member can thus turn through ±90° on either side of its median position shown in FIG. 6, thus enabling each of the pickups to sweep through 180° and enabling the two pickups, used in succession, to sweep over the whole of the circumference of the pipe 1. The user of two pickups with a part-circular slide member 60 forming a half-circumference makes it possible to limit the extent of the movement of the supply conductors of the motor 63 and to reduce the weight and size of the measurement module 2. This weight is in addition reduced by the floats 46, 47 and by the cutouts which FIGS. 6 and 7 show in the circular slide member 60, in the half-crown 58, and in the fixed half-collar 43.

The measurement module can in particular be installed on the pipe by means of a remote-controlled or manned submarine unit.

Persons versed in the subject will readily understand that numerous modifications can be made to the embodiments described above, without departing from the scope of the invention.

There is thus provided on ovalisation measurement process and apparatus which can be applied generally to pipes, whether these pipes are bare or coated with an anti-corrosion material and/or clad with concrete, and whether the concrete includes no metal reinforcement or has a reinforcement composed of thin wire mesh or of thick wire mesh, that is to say of wire of a diameter equal to or greater than 5 mm.

What is claimed is:

1. Apparatus for measuring the ovalisation of a pipe, comprising a collar, means for fastening said collar around a pipe, a measurement module mounted on said collar, a circular track supported by said collar, a circular slide member disposed on said track, means for moving said slide member on said track, at least one longitudinal arm solid with said slide member and extending longitudinally of the pipe, an electromagnetic pickup aligned normal to the longitudinal axis of said pipe and fixed on said arm, said pickup transmitting a signal which is influenced by the radial distance between said pickup and said pipe, an electric energy supply and signal processing means comprising comparison means and associated memory means for comparing the transmitted signal with a plurality of signal values supplied by previous measurements, made on a similar pipe and stored in said memory means, to obtain therefrom indications relating to the distance between said locations and said pipe, and electrical connection means between said supply and processing means of said measurement module for permitting the transmission to said supply and processing means of signals transmitted by said electromagnetic pickup, wherein said supply and processing device comprises an alternating-current voltage supply including a synchronous demodulator means for receiving signals transmitted by said electromagnetic pickup and for supplying, from one input signal, two output signals related to the amplitude and the phase of the input signal.

2. Apparatus according to claim 1, wherein said synchronous demodulator is preceded by a filter with a narrow bandpass.

3. Apparatus according to claim 1, wherein said output signals of said synchronous demodulator are fed to respective filters of the integrator type.

4. Apparatus according to claim 1, further comprising display means coupled to said comparison means for displaying said indications.

5. Apparatus according to claim 1, wherein said pickup comprises at least three parallel elongate magnetic cores, each carrying a first coil and a second coil situated respectively near a first and a second end of said cores, said core ends being defined by one and the same direction extending from said first to said secone end for said three cores, said three first coils being electrically connected in parallel and said three second coils being electrically connected in parallel so as to form respectively two branches of a measuring bridge.

6. Apparatus according to claim 1, wherein said collar is U-shaped and is provided with two support ribs situated in the rounded part of said U and two flexible inflatable gripper jacks situated on the arms of said U.

7. Apparatus according to claim 1, wherein said circular track and said circular slide member extend over approximately a half-circumference.

8. Apparatus according to claim 1, wherein said circular track is supported on said fastening collar by a carriage adapted to move longitudinally along a slide member on said fastening collar.

9. Apparatus according to claim 1 further comprising another said longitudinal arm diametrically opposite the first-mentioned arm, and another said pickup fixed on said another arm.

* * * * *